United States Patent
Gehrmann

Patent Number: 6,141,063
Date of Patent: Oct. 31, 2000

[54] CHROMA KEY METHOD AND ARRANGEMENT

[75] Inventor: Rainer Gehrmann, Alsbach-Hähnlein, Germany

[73] Assignee: U.S. Philips Corporation, New York, N.Y.

[21] Appl. No.: 08/937,312

[22] Filed: Sep. 22, 1997

[30] Foreign Application Priority Data

Sep. 25, 1996 [DE] Germany ............... 196 39 355

[51] Int. Cl.$^7$ ............... H04N 9/74; H04N 9/75
[52] U.S. Cl. ............... 348/592; 348/587; 348/586; 348/591
[58] Field of Search ............... 348/586, 587, 348/591, 590, 592, 599, 630, 631; 345/113, 114; H04N 9/74, 9/75

[56] References Cited

U.S. PATENT DOCUMENTS

| | | | |
|---|---|---|---|
| 5,301,016 | 4/1994 | Gehrmann | 348/586 |
| 5,327,177 | 7/1994 | DesJardins et al. | 348/586 |
| 5,343,252 | 8/1994 | Dadourian . | |
| 5,386,242 | 1/1995 | Chaplin | 348/591 |
| 5,416,529 | 5/1995 | Lake | 348/590 |
| 5,428,401 | 6/1995 | Hinson | 348/586 |
| 5,436,671 | 7/1995 | Gehrmann | 348/587 |
| 5,444,633 | 8/1995 | Gehrmann | 348/587 |
| 5,708,479 | 1/1998 | Gehrmann | 348/587 |
| 5,719,640 | 2/1998 | Gehrmann | 348/587 |
| 5,825,433 | 10/1998 | Yamada et al. | 348/584 |
| 5,838,310 | 11/1998 | Uya | 345/186 |
| 5,937,104 | 8/1999 | Henderson et al. | 382/279 |

FOREIGN PATENT DOCUMENTS

| | | | |
|---|---|---|---|
| 0267553B1 | 5/1988 | European Pat. Off. | H04N 5/20 |
| 4143180 | 7/1993 | Germany | H04N 9/74 |
| 6225329 | 8/1994 | Japan . | |
| 2262860 | 6/1993 | United Kingdom . | |
| 2263040 | 7/1993 | United Kingdom . | |

*Primary Examiner*—John K. Peng
*Assistant Examiner*—Linus H. Lo
*Attorney, Agent, or Firm*—Edward W. Goodman

[57] ABSTRACT

A method and an arrangement for generating a composite video signal in accordance with the chroma-key method in which a virtual background spill signal is generated and added to the composite video signal to avoid darkening effects which are produced when eliminating spill light, and to eliminate brightening effects which are produced in "clean-up" operations. The background spill signal may consist of the product of a virtual spill signal source (SP) and a control signal ($k_3$). The control signal ($k_3$) is preferably the difference between a foreground control signal ($k_1$) and a background control signal ($k_2$), and both signals should be identical in the foreground and background ranges but different in spill ranges.

11 Claims, 3 Drawing Sheets

CHROMA KEY METHOD AND ARRANGEMENT

FIELD OF THE INVENTION

The invention relates to a method of generating a video signal composed of a foreground signal and a background signal formed in accordance with the chroma-key method, in which the background signal is inserted, in accordance with the subtractive method and with the aid of a control signal derived from the foreground signal, into parts of said foreground signal fixed by a predetermined key color, in this subtractive method, the part of a key color reference vector is subtracted from the vector of the foreground signal and a corresponding part of the vector of the new background signal is additively inserted in accordance with the equation:

$$V_{out} = FG - k \cdot KC + k \cdot BG.$$

DESCRIPTION OF THE RELATED ART

Such a method is described in German Patent 41 43 180 A1, corresponding to U.S. Pat. No. 5,381,184. However, in this known subtractive method, the problem of stray light, or spill, generated by the foreground backing is not taken into account. As is known, the scenes in the chroma-key method are formed in such a way that objects in the foreground are recorded by means of a television camera in front of a single-color screen, generally a blue screen, or backing, and the image parts of the foreground blue backing are replaced by a background scene. The spill light generated by the blue backing may then often be laterally incident on parts of the foreground objects, producing a blue haze on and beyond the sides. The spill light should therefore be absolutely reduced. However, if spill were to be suppressed by means of the known chroma-key method, this would lead to a light transparency in the foreground objects. While avoiding this transparency, dark edges and areas could be produced at the spill locations.

A method of generating video signals composed of foreground and background signals is known from U.S. Pat. No. 5,343,252, in which one of the objects is also a reduction of spill. However, this known method and the associated arrangement for performing the method are relatively elaborate in generating a plurality of control signals for the single color components.

SUMMARY OF THE INVENTION

It is therefore an object of the present invention to provide a method of the type described in the opening paragraph, in which key color spill, or blue spill, is suppressed without producing dark or bright edges or areas.

According to the invention, this object is solved in that, for suppressing key color spill in the foreground signal, a modified control signal for the background signal is first derived from the control signal of the key color after an adjustable threshold value has been exceeded, and in that subsequently, an artificial background spill signal weighted with a further control signal is added to the video output signal in accordance with the equation:

$$V_{out} = FG - k_1 \cdot KC + k_2 \cdot BG + k_3 \cdot SP.$$

The method according to the invention has the advantage that not only the (blue) spill on foreground objects is reduced by appropriate illumination, selection of diffusing materials and positioning of objects in front of the blue backing, but also that the scenes can be formed in a simpler manner and with fewer problems when artificial background spill light is added. Moreover, the artificial background spill light may even be used specifically so as to achieve an even more natural link between the background and the foreground.

Since the further control signal is derived by subtracting the control signals from the key color and the background signal, those areas of an image which fall within the proportional area during color keying can be selectively influenced, i.e., object edges, semitransparent objects and opaque objects illuminated with stray light. Such an influence gives the impression of an additional diffuse, backward illumination, with the light source itself being invisible. The dark error mentioned hereinbefore is fully compensated so that the previously darkened edges and areas now give a considerably more natural impression.

The extent of influence is dependent on the value of the difference between the two control signals, i.e., the size of the clip area in deriving the control signal for the background signal. A large clip area is necessary when the image comprises much stray light which should be removed. The removal of a large quantity of blue spill thus automatically corresponds to the insertion of a large quantity of artificial background spill light.

However, the extent of influence is also dependent on the size of the virtual spill signal source which, in the simplest case, may be a static color area. This area is constant with respect to time and location and may have three manually adjustable parameters Y, $C_R$ and $C_B$ with which the dark error can be eliminated and further color correction effects, or effects alienating the formation of a scene can be achieved.

It is also possible to constitute the virtual spill signal source as a dynamic color area, particularly in dependence upon the average value of the new background signal. The spill signal should then remain locally constant, i.e., throughout the image area. The spill signal source should automatically match the average value of the new background image, both as regards luminance and as regards chrominance. This does not only preclude the necessity of a manual adjustment but also results in an even more natural impression of the image. The background spill signal of the foreground thus matches the average signal level of the background signal, and hence yields a stronger impression of coherence. When the new background image becomes dark, the artificial spill light is also absent in the foreground image, and when the background image becomes brighter, the artificial background spill light increases in the foreground image.

These and other aspects of the invention are apparent from and will be elucidated with reference to the embodiments described hereinafter.

DESCRIPTION OF THE PREFERRED EMBODIMENT

Figure 1A:
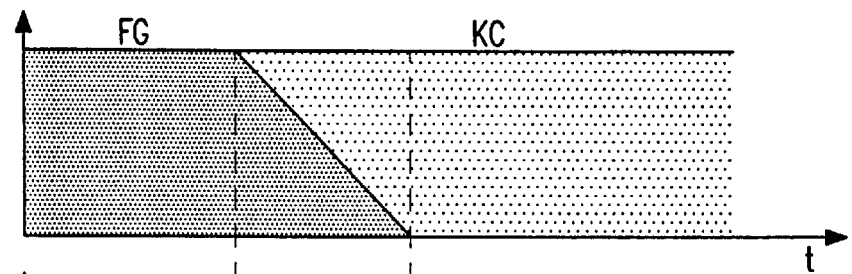
FIG. 1a is a diagram showing the variation with respect to time of the foreground signal and the key color signal.
Figure 1B:
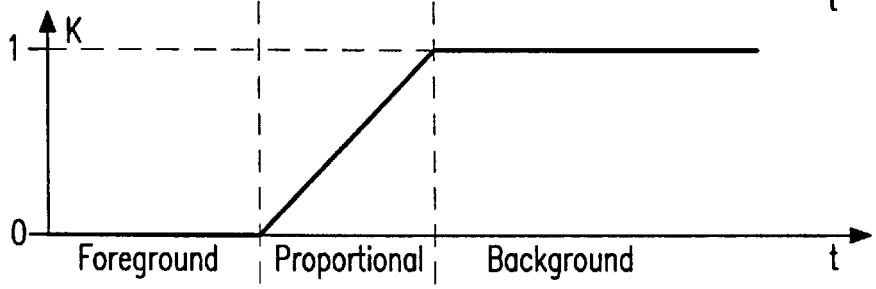
FIG. 1b is a diagram showing the variation with respect to time of the associated control signal.
Figure 1C:
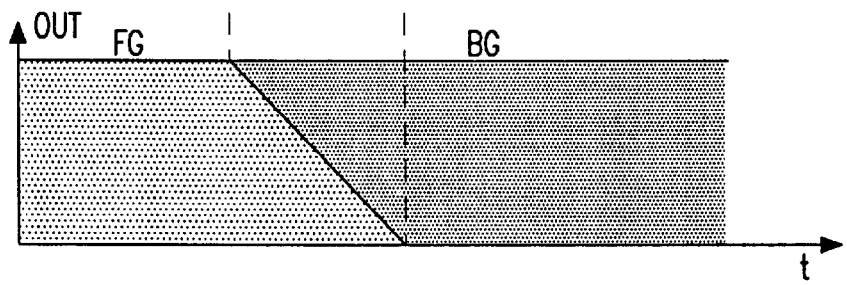
FIG. 1c is a diagram showing the variation with respect to time of the foreground signal and the corresponding background signal.

FIGS. 1a–1c show the variations with respect to time of the signals used in the subtractive chroma-key method. FIG. 1a shows the variation with respect to time of the foreground signal FG and the signal of the key color KC (generally blue) in the foreground image, which signal is to be substituted for a corresponding background signal BG. FIG. 1b shows the variation with respect to time of the control signal k with which the part between the foreground signal and the background signal can be formed. As is known, in the subtractive method, the part of a key color reference vector KC is subtracted from the foreground signal FG and a correspondingly large part of the new background signal BG is additively inserted in accordance with the equation $$V_{out} = FG - k \cdot KC + k \cdot BG.$$

The control signal k is used as a measure of forming the part, which control signal can be subdivided into three ranges:

1. The foreground range:
   The control signal k has the value 0 where the image signal can be unambiguously assigned to the foreground which, at this location, is absolutely not influenced by the key color KC. Here, neither the key color is removed, nor a new background is inserted.
2. The background range:
   The control signal k has the value 1 where the image signal assumes key color values corresponding to (or even exceeding) the selected reference key color. Here, the image signal only consists of the key color which is fully removed during the keying process and is replaced by a 100% inserted new background.
3. The proportional range:
   The control signal k has values of between 0 and 1 in the proportional range where the key color is not completely visible but where only a part of this color is visible due to shadows or partial covering by the foreground object. Here, only a proportional part of the reference key color is removed. Thus, the part of the foreground signal remains, and a part of the new background signal with a relative size corresponding to that of the removed key color is inserted.

This subdivision into three ranges is normally sufficient, at least as long as the selection of the key color part during color keying actually allows a reliable conclusion about the visibility of the blue backing and, hence, the future visibility of the new background. A relatively large control signal k normally means that a relatively large part of the blue backing was visible and that the foreground object must have been very transparent at this location. Thus, normally, a correspondingly large part of the background signal must be inserted after removal of the key color, as is shown in FIG. 1c.

However, when blue spill from the blue backing is laterally incident on the foreground object, the visibility of the key color does not yield an adequate conclusion about the transparency of the foreground. It is true that the blue spill incident on an opaque foreground object leads to a given value of the control signal k, but it would be wrong to draw conclusions about the visibility of the blue backing or the future background on the basis of this control signal k. Here, the control signal would insert a part of the background signal, which would give the foreground object a transparent appearance.

To avoid such a transparency, which is caused by the spill light, it is known (cf. U.S. Pat. No. 5,343,252) to make a distinction between a control signal $k_1$, which determines the part of the key color to be subtracted, and a modified control signal $k_2$, which determines the part of the background signal to be inserted. For this purpose, the subtraction equation is modified as follows:

$$V_{out} = FG - k \cdot KC + k_2 \cdot BG.$$

Figure 2A:
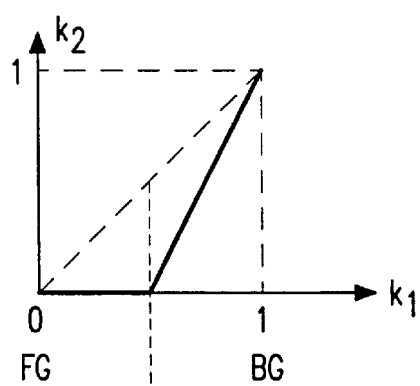
FIG. 2a is a diagram showing the coherence between the two new control signals for the foreground signal and the background signal.
Figure 3A:
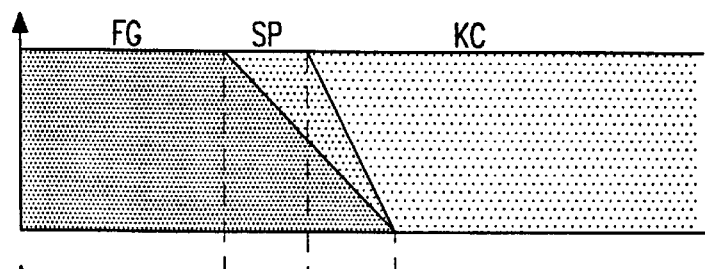
FIG. 3a is a diagram showing the variation with respect to time of the foreground signal and the key color signal with a spill component.
Figure 3B:
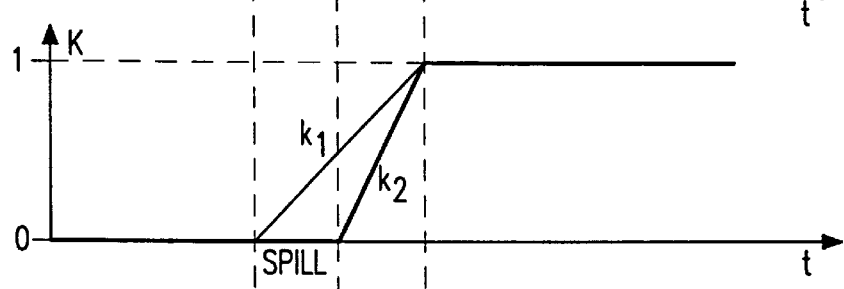
FIG. 3b is a diagram showing the variation with respect to time of the associated control signals.

FIG. 2a shows the coherence between the control signals $k_1$ and $k_2$. The control signal $k_1$ corresponds to the earlier control signal k, and the control signal $k_2$ is obtained from the control signal $k_1$ (or k) by means of conventional clip/gain processing (see, for example, European Patent EP 0 267 553 B1, corresponding to U.S. Pat. No. 4,771,192). In the control signal $k_2$, the foreground range (value 0) is extended with respect to the control signal $k_1$, i.e., the background insertion is suppressed in the ranges where a certain key color subtraction already takes place ($k_1 > 0$), so that the control signal $k_1$ matches the part of the foreground which is free from spill light and the new control signal $k_2$ matches the part of the foreground which is beset with spill light, as is shown in FIGS. 3a and 3b.

This procedure has the positive result that the blue spill is fully removed from the foreground object and that the foreground simultaneously remains "opaque" in the pure spill range SP. This procedure has the drawback that such a removal of spill light leads to a lack of signals which is not filled up, see FIG. 3c. Areas previously influenced by spill light now get dark shadows and object edges get dark contours because a part of the signal was also removed therefrom. The displayed image then gives an unnatural and hard impression.

To obviate this signal drop, the invention proposes to generate a new, artificial spill signal to be added to the image. The new background spill signal may be derived from a virtual spill signal source SP (comprising the signals Y, CR, CB) and controlled by means of a suitable further control signal $k_3$.

Figure 3C:
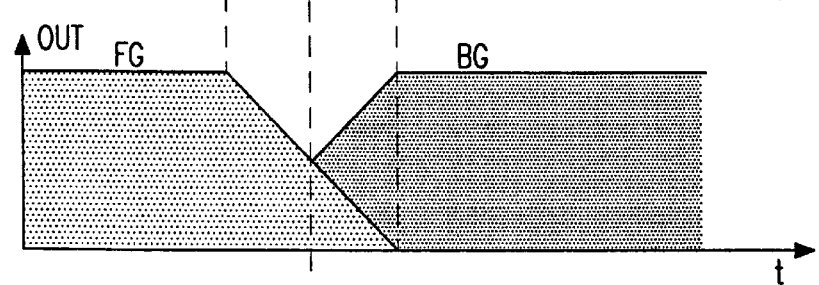
FIG. 3c is a diagram showing the variation with respect to time of the foreground signal and the background signal with the corresponding spill removal.

The signal drop between the foreground and the background signal in FIG. 3c is caused by the difference between the control signals $k_1$ and $k_2$ and should now be compensated. The compensation may be essentially realized by controlling the artificial spill signal with a control signal $k_3$ which preferably corresponds to the difference between the control signals $k_1$ and $k_2$. The previously mentioned equation should thus be supplemented by the term $(k_1-k_2) \cdot SP$ to:

$$V_{out} = FG - k_1 \cdot KC + k_2 \cdot BG + (k_1-k_2) \cdot SP.$$

Figure 2B:
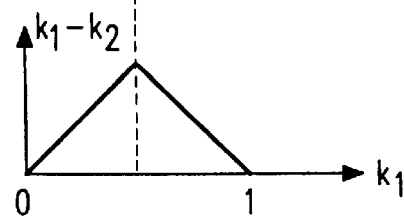
FIG. 2b is a diagram showing the difference signal of the two new control signals.

FIG. 2b shows the control difference signal with respect to $k_1$. It is 0 in the foreground range ($k_1=0$ and $k_2=0$) and in the background range ($k_1=1$ and $k_2=1$). These two ranges are thus not influenced in any way by the spill signal control. The spill signal effect is greatest in a central $k_1$ range, namely where $k_2$ has its starting point. The lack of signals, as shown in FIG. 3c, can thus be fully compensated by means of this signal.

Figure 4A:
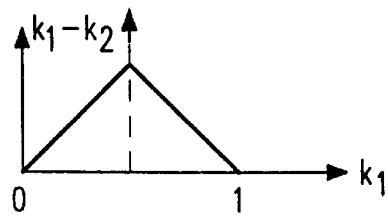
FIG. 4a is a diagram showing the coherence between the two new control signals for a further application.
Figure 4A:
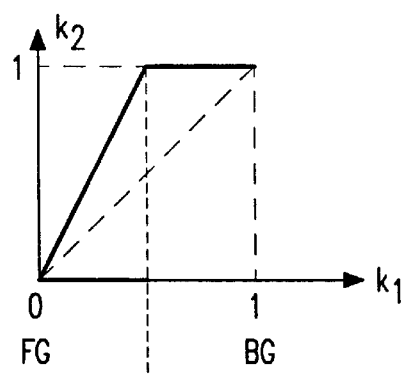

In the method described so far, in which spill light incident on foreground objects is eliminated, the additional control signal $k_2$ of FIG. 2a has a lower value than the foreground control signal $k_1$. The resultant darkening effects are to be eliminated by the virtual background spill signal as proposed in accordance with the invention. However, there is another necessity of deriving a separate background control signal $k_2$. To avoid modulations of the background control signal in the background range (such as noise or shadows) due to the "clean-up" method, the control signal $k_2$ should be limited at its upper end. This is also realized by means of a clip/gain operation and yields the characteristic curves shown in FIG. 4a. Here, the background range instead of the foreground range of the control signal $k_2$ is extended. The values of the control signal $k_2$ now exceed those of the foreground signal $k_1$. The result is that, in the proportional range, more background signal is added than key color was previously removed. This becomes manifest as unnatural, bright edges, particularly at the edges of objects.

Figure 4B:
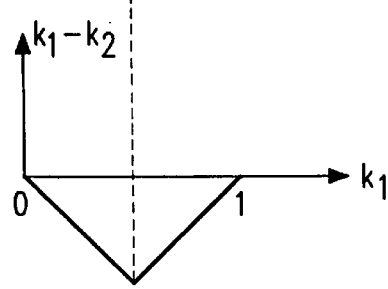
FIG. 4b is a diagram showing the difference signal for this further application.

To avoid these bright edges, an artificial spill signal SP is also added here. As is shown in FIG. 4b, the control difference signal $k_1-k_2$ now has a negative value. This means that a background spill signal is now subtracted in the critical range. When the spill signal SP corresponds to the average brightness of the background signal, then exactly the amount which was previously added too much will be subtracted (on average) in the proportional range.

Figure 5:
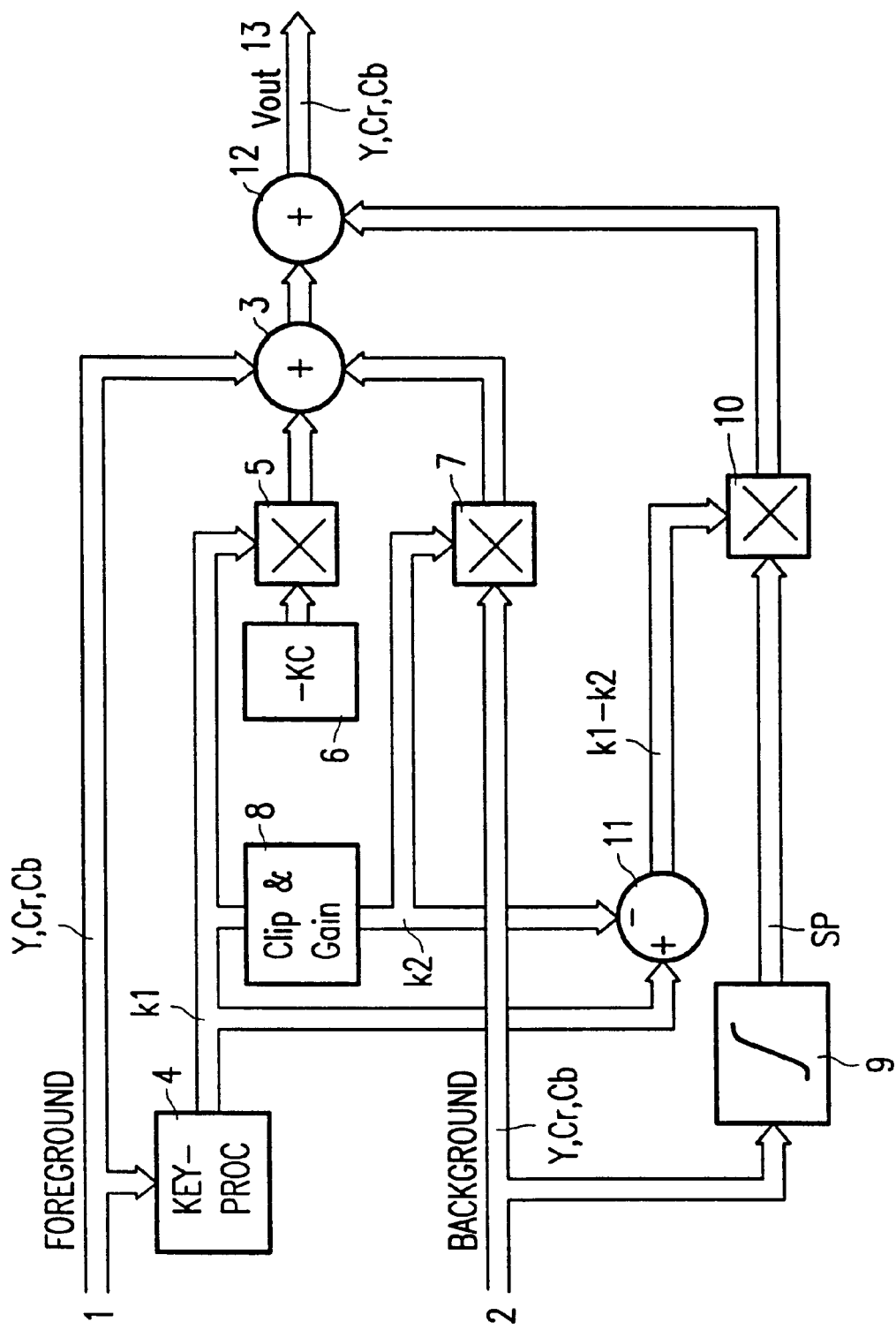
FIG. 5 shows an arrangement for performing the method according to the invention.

FIG. 5 shows an advantageous arrangement for performing the method according to the invention. This arrangement receives a foreground signal FG at 1 and a background signal BG at 2, both signals consisting of a luminance component Y and the chrominance components $C_R$ and $C_B$. The foreground signal FG is applied to a first input of a first adder stage 3 and to a key-processor 4 for generating the control signal $k_1$. The control signal $k_1$ derived from the foreground signal is then applied to the first input of a first multiplier 5 having a second input which conveys the output signal −KC of a key color signal generator 6. The output signal of the first multiplier 5 is applied to the second input of the adder stage 3. The background signal BG from the input 2 is applied to a first input of a second multiplier 7 having a second input which conveys a control signal $k_2$ derived from the control signal $k_1$ in a clip-and-gain stage 8. The output of the second multiplier 7 is connected to a third input of the first adder stage 3.

Moreover, a background spill signal SP is derived from the background signal BG by means of an integration stage 9 and applied to a first input of a third multiplier 10 having a second input which conveys a further control signal $k_3$ derived by subtraction of the control signals $k_1$ and $k_2$ in the stage 11. This background spill signal $k_3$ is now applied to an input of a second adder stage 12 having another input which is connected to the output of the first adder stage 3. A video output signal $V_{out}$ defined by the equation $$V_{out}=FG-k_1 \cdot KC+k_2 \cdot BG+k_3 \cdot SP$$

which signal is substantially free from spill signal parts can then be taken from the output 13 of the arrangement.

I claim:

1. A method of generating a video signal ($V_{out}$) composed of a foreground signal and a background signal formed in accordance with a chroma-key method in which a background signal (BG) is inserted, in accordance with a subtractive method and with the aid of a control signal (k) derived from the foreground signal (FG), into parts of said foreground signal fixed by a predetermined key color (KC), wherein in said subtractive method, a part of a key color reference vector (KC) is subtracted from a vector of the foreground signal, (FG) and a corresponding part of a vector of the background signal (BG) is additively inserted in accordance with the equation:

$$V_{out}=FG-k \cdot KC+k \cdot BG,$$

characterized in that, for suppressing key color spill in the foreground signal (FG), said method comprises the steps:

deriving a modified control signal ($k_2$) for the background signal (BG) from the control signal ($k_1$) of the key color after an adjustable threshold value has been exceeded; and adding an artificial background spill signal (SP) weighted with a further control signal ($k_3$) to the video output signal ($V_{out}$) in accordance with the equation:

$$V_{out}=FG-k_1 \cdot KC+k_2 \cdot BG+k_3 \cdot SP.$$

2. A method as claimed in claim 1, characterized in that the control signal ($k_2$) of the background signal (BG) is derived from the control signal ($k_1$) of the key color (KC) by means of a clip-and-gain operation.

3. A method as claimed in claim 1, characterized in that said method further comprises the step:

deriving a further control signal ($k_3$) by subtracting the control signals ($k_1$, $k_2$) of the key color (KC) and the background signal (BG):

$$k_3=k_1-k_2.$$

4. A method as claimed in claim 1, characterized in that the background spill signal (SP) is produced by a virtual spill signal source.

5. A method as claimed in claim 4, characterized in that the virtual spill signal source is a static color area.

6. A method as claimed in claim 5, characterized in that the static color area is constant with respect to time and location, said static color area having three manually adjustable parameters (Y, $C_R$, $C_B$).

7. A method as claimed in claim 4, characterized in that the virtual spill signal source is a dynamic color area which depends on the background signal (BG).

8. A method as claimed in claim 7, characterized in that the dependence of the background signal (BG) is determined by an average value of the background signal which is automatically influenceable both as regards luminance and as regards chrominance.

9. An arrangement for generating a video signal ($V_{out}$) composed of a foreground signal and a background signal formed in accordance with a chroma-key method in which a background signal (BG) is inserted, in accordance with a subtractive method and with the aid of a control signal (k) derived from the foreground signal (FG), into parts of said foreground signal fixed by a predetermined key color (KC), wherein in said subtractive method, a part of a key color reference vector (KC) is subtracted from a vector of the foreground signal, (FG) and a corresponding part of a vector of the background signal (BG) is additively inserted in accordance with the equation:

$$V_{out}=FG-k \cdot KC+k \cdot BG,$$

characterized in that said arrangement comprises:

a first adder having a first input for receiving the foreground signal (FG);

a key-processor for generating the control signal ($k_1$), said key-processor having an input for receiving the foreground signal (FG);

means for generating a key color signal (−KC);

a first multiplier having a first input for receiving the control signal ($k_1$) from the key-processor, a second input for receiving the key color signal (−KC), and an output which is connected to a second input of the first adder stage;

means coupled to said key-processor for generating a modified control signal ($k_2$);

a second multiplier having a first input for receiving the background signal (BG), a second input for receiving the modified control signal ($k_2$), and an output connected to a third input of the first adder stage;

a subtraction stage having a first input coupled to the output of the key-processor and a second input coupled to an output of said modified control signal generating means for subtracting said modified control signal from said control signal;

a virtual spill signal source having an input for receiving said background signal;

a third multiplier having a first input connected to an output of the subtraction stage, a second input connected to an output of said virtual spill signal source (SP); and a second adder stage having a first input connected to an output of the third multiplier, a second input connected to an output of the first adder stage, and an output for supplying the video signal ($V_{out}$) which is freed from key color spill.

10. An arrangement as claimed in claim 9, characterized in that said modified control signal generating means comprises a clip-and-gain stage having an input for receiving the control signal ($k_1$) from the key-processor and an output for supplying the modified control signal ($k_2$).

11. An arrangement as claimed in claim 9, characterized in that said virtual spill signal source comprises an integration stage having an input for receiving the background signal (BG) and an output for providing the virtual spill signal (SP).

* * * * *